US012693742B2

(12) United States Patent
Huang

(10) Patent No.: US 12,693,742 B2
(45) Date of Patent: Jul. 28, 2026

(54) WEARABLE DEVICE WITH HAPTIC FEEDBACK AND STIMULATIONS FOR THE PHYSICALIZATION OF REMOTE DIGITAL INTERACTION

(71) Applicant: Rui Huang, Guangdong (CN)

(72) Inventor: Rui Huang, Guangdong (CN)

( * ) Notice: Subject to any disclaimer, the term of this patent is extended or adjusted under 35 U.S.C. 154(b) by 338 days.

(21) Appl. No.: 18/338,733

(22) Filed: Jun. 21, 2023

(65) Prior Publication Data

US 2023/0418384 A1     Dec. 28, 2023

(30) Foreign Application Priority Data

Jun. 22, 2022    (CN) ......................... 202210711319.X

(51) Int. Cl.
*G06F 3/01*         (2006.01)
*H04R 1/10*         (2006.01)
(52) U.S. Cl.
CPC ............. *G06F 3/016* (2013.01); *H04R 1/105* (2013.01)
(58) Field of Classification Search
CPC ....... G06F 3/016; H04R 1/105; H04R 1/1041; H04R 1/1066; H04R 25/604; H04R 2400/03
USPC ........................... 381/311, 309, 74, 367, 162
See application file for complete search history.

(56) References Cited

U.S. PATENT DOCUMENTS

| | | | | | |
|---|---|---|---|---|---|
| 6,081,604 | A | * | 6/2000 | Hikichi | ................ H04R 5/0335 |
| | | | | | 381/124 |
| 8,767,996 | B1 | * | 7/2014 | Lin | ......................... G06F 3/165 |
| | | | | | 381/370 |
| 2016/0166930 | A1 | * | 6/2016 | Brav | ...................... G08B 21/02 |
| | | | | | 463/30 |
| 2021/0249758 | A1 | * | 8/2021 | van Erven | ........... H04R 1/1016 |

* cited by examiner

*Primary Examiner* — Vivian C Chin
*Assistant Examiner* — Douglas J Suthers

(57)     ABSTRACT

A wearable device with a tangible user interface to provide haptic feedback and multi-sensorial stimulation for the physicalization of remote digital interaction, which comprises a headband, an array of haptic/kinesthetic feedback actuators, the first earpiece and the second earpiece, physiological sensing modules, and dynamic position sensing modules. The array of the haptic/kinesthetic feedback actuators is embedded, and evenly or unevenly distributed, in the headband. The invention has the following advantages compared to the prior arts: the solution introduces haptic and kinesthetic feedback and stimulation into remote communication and digital interaction, and more specifically, involves a device with a dual-layers interface, comprising of a haptic-based tangible layer and an audio channel, through which introduces tactile and kinesthetic feedback into remote communication, and translates gestures, facial expressions, tone of voice, and other tangible stimuli into haptic representations, following the principle guided by the 'tactile and kinesthetic feedback semantic database'.

10 Claims, 11 Drawing Sheets

1

WEARABLE DEVICE WITH HAPTIC FEEDBACK AND STIMULATIONS FOR THE PHYSICALIZATION OF REMOTE DIGITAL INTERACTION

1. TECHNICAL FIELD

The invention relates to the technology that enables the physicalization of remote digital interaction, in particular to a wearable device with a tangible user interface to provide haptic/kinesthetic feedback and multi-sensorial stimulation.

2. BACKGROUND ART

Advancement in science and engineering has brought prosperities to the development of technologies that blend the virtual and digital cyberspace with the physical world, like digital media, and virtual-, mixed-, and augmented-reality. Interaction with the external world and communication with one another has shifted from being entirely physical to being more remote and virtual based, expanding beyond the physical existence. The world is in transition to a hyper-digital lifestyle with remote living and working becoming the new norm. However, existing communication devices, voice playback devices, or computing devices that incorporates input and output can only transmit audio and digital information, which is intangible. In face-to-face communication or in-person interaction between people, audio or single layer stimulus can only be regarded as a fraction of the multimodal human senses. Gesture, body movements, facial expressions, tone of voice, emotions, and other forms of sensory information or stimuli are also essential to the comprehension of contextual meaning and semantics of the conversation. The current human-machine interaction model neglects tactile sensation substantially and has impacted our wellbeing. Findings suggest depression, anxiety, PTSD, mental and secondary immune disorders have increased by up to 40% as a result of touch and tactile deprivation. Therefore, intelligent wearable devices need to compensate for the loss of physical interaction in digital communication, and to reintroduce tangible interaction, in particular haptic feedback, to enhance the comprehension of contextual meaning and semantics of the conversation, and to augment the communication of emotions as well as other multimodal human senses.

3. SUMMARY OF THE INVENTION

To solve the technical problems in the background, the invention provides the following technical solution: a wearable device with a tangible user interface to provide haptic feedback and multi-sensorial stimulation for the physicalization of remote digital interaction, comprising a headband, an array of haptic/kinesthetic feedback actuators, the first ear piece and the second ear piece, physiological sensing modules (for example, but not limited to, optical heart rate sensor, and/or electroencephalogram recorder), and dynamic position sensing modules (for example, but not limited to, inertial measurement unit, accelerometer, and/or gyroscope). The array of the haptic/kinesthetic feedback actuators is embedded, and evenly or unevenly distributed as a surround ring across the headband. The outer part of the headband is fitted with a headband housing. The two ends of the headband housing are respectively connected to the first earpiece and the second earpiece, both of which have an embedded audio module (including, but not limited to, bone conduction audio module, or/and loudspeaker module). The power supply module is located on the headband positioned near the first-ear-piece end, and the CPU processor is located on the headband positioned close to the second-ear-piece end. The first audio receiver and the second audio receiver are also situated on the same side as the CPU processor;

A touch control module (for example, but not limited to, a touch-responsive surface that consists of electric-inducted materials) is also encased at the corresponding position on the headband.

Similarly, the invention can also be implemented as a wireless audio device ear-hook, head-mounted, or neckband audio device;

The wireless ear-hook embodiment comprises the first ear-hook body and the second ear-hook body, the first in-ear module and the second in-ear module, an array of haptic/kinesthetic feedback actuators. The first in-ear module and the second in-ear module are both encased by external housings. The first in-ear module and the second in-ear module comprise respectively a set of audio module, audio receiver, CPU processor, wireless communication module, battery module, physiological sensing modules (for example, but not limited to, optical heart rate sensor, and/or electroencephalogram recorder), and dynamic position sensing modules (for example, but not limited to, inertial measurement unit, accelerometer, and/or gyroscope). Two sets of haptic/kinesthetic feedback actuators in an array arrangement are embedded respectively in the first and second ear-hook body; a touch control module (for example, but not limited to, a touch-responsive surface that consists of electric-inducted materials) is also encased at the corresponding position on the first ear-hook body.

The head-mounted embodiment comprises a headband, an array of haptic/kinesthetic feedback actuators, the first earpiece and the second earpiece, physiological sensing modules (for example, but not limited to, optical heart rate sensor, and/or electroencephalogram recorder), and dynamic position sensing modules (for example, but not limited to, inertial measurement unit, accelerometer, and/or gyroscope). The array of the haptic/kinesthetic feedback actuators is embedded, and evenly or unevenly distributed, in the headband. The outer part of the headband is fitted with a headband housing. The two ends of the headband housing are respectively connected to the first earpiece and the second earpiece, both of which have an embedded audio module (including, but not limited to, bone conduction audio module, or/and loudspeaker module), audio signal processing and conversion module, driver, and internal circuits. The first earpiece comprises a CPU, a storage unit, a wireless communication module, the physiological sensing module, the dynamic position sensing module, the first audio receiver, and the second audio receiver. A touch control module (for example, but not limited to, a touch-responsive surface that consists of electric-inducted materials) is also encased at the corresponding position on the first earpiece. A power supply unit, comprising a power supply pack and a control chip, is encased in the second earpiece; all the modules are electrically connected to the CPU via I2C interface and wiring.

The neckband embodiment comprises a neckband, an array of haptic/kinesthetic feedback actuators, the first in-ear module and the second in-ear module, physiological sensing modules (for example, but not limited to, optical heart rate sensor, and/or electroencephalogram recorder), and dynamic position sensing modules (for example, but not limited to, inertial measurement unit, accelerometer, and/or gyroscope). The array of the haptic/kinesthetic feedback actuators is embedded, and evenly or unevenly distributed, in the neckband. The two ends of the neckband housing are connected to the first in-ear module and the second in-ear module via wiring and IC interfaces. The outer part of the neckband, the first in-ear module, and the second in-ear module are all fitted with respective housings. Each of the in-ear module has an embedded audio module (including, but not limited to, bone conduction audio module, or/and loudspeaker module), audio signal processing and conversion module, driver, and internal circuits. A CPU, a storage unit, and a wireless communication module are encased on the neckband near the first in-ear module end; and a power supply unit, comprising a power supply pack and a control chip, is encased in the second in-ear. The physiological sensing module, the first audio receiver, and the second audio receiver are situated in the first in-ear module; and the dynamic position sensing module is located at the second in-ear module, and/or encased in the neckband housing. A touch control module (for example, but not limited to, a touch-responsive surface that consists of electric-inducted materials) is also embedded at the corresponding position on the first in-ear module, and/or the neckband. All the modules are electrically connected to the CPU via I2C interface and wiring.

Compared to the prior arts, the invention has the following advantages: the solution is a dual-layers interface, comprising of a haptic-based tangible layer and an audio channel, through which introduces tactile and kinesthetic feedback into remote communication and translates gestures, facial expressions, tone of voice, and other tangible stimuli into haptic representations to augment the communication of emotions, feelings, semantics, and contextual meanings of the conversations. This dual-layers system forms a real-time two-way feedback loop that communicates audio as well as tactile and kinesthetic stimulations, which helps and augments people to comprehend the semantics, meanings, and contexts of the audio content or the conversation. The interface also incorporates a touch responsive panel that enables users to directly send and received gestures, activities, or other tangible stimuli. The invention has wide applications, including long-distanced voice communication, remote collaboration, audio augmentation, VR and AR augmentation, and other digital, remote, or immersive applications or scenarios.

Further, the CPU processor comprises one or more processors, control units, storage, wireless communication circuits, physiological sensing modules (for example, but not limited to, optical heart rate sensor, and/or electroencephalogram recorder), dynamic position sensing modules (for example, but not limited to, inertial measurement unit, accelerometer, and/or gyroscope), power supply modules, storage unit, and wireless communication circuit; The physiological sensing module and the dynamic position sensing module are electrically connected to the CPU processor and power supply module through built-in circuits and I2C interface.

Further, The array of the haptic/kinesthetic feedback actuators is embedded in, and evenly or unevenly distributed, around the headband (encased within the ear-hook body in the case of wireless ear-hook device embodiment, and encased within the neckband in the case of the neckband embodiment), and is electrically connected to the CPU processor and power supply module through built-in circuits and I2C interface, providing surround vibration-based haptic and kinesthetic feedback.

Further, the first and the second earpiece comprise respectively a first ear clip housing and a second ear clip housing, and the first and the second ear clip housing interior are encased with respective audio modules (including, but not limited to, bone conduction audio module, or/and loudspeaker module), audio signal processing and conversion modules, drivers; a touch control module (for example, but not limited to, a touch-responsive surface that consists of electric-inducted materials) is also encased at the corresponding position at the exterior of the first ear clip housing; All modules are connected to the CPU processor and power supply module through built-in circuits and I2C interface inside the headband.

Further, the compatible audio module for the first earpiece comprises a bone conduction vibrator unit, and/or loudspeaker, and an audio signal processing unit; All modules are connected by built-in circuits, and the audio signal processor is electrically connected to the CPU processor and the power supply device via an I2C interface.

Further, the second earpiece comprises a second earpiece housing, an audio module, a biometric sensor, and a contact sensor; An LED module is embedded on the surface of the first earpiece housing; All modules are connected to the CPU processor and the power supply module through built-in circuits and an I2C interface within the headband.

Further, the audio module compatible with the second earpiece comprises a bone conduction vibrator unit, and/or a speaker, as well as an audio signal processing unit; All the audio signal processor is electrically connected to the CPU processor and the power supply device via built-in circuits and an I2C interface; specifically, the audio signal processing unit comprises a digital-to-analog conversion transducer module and a digital amplifier; one end of the digital-to-analog transducer module is electrically connected to the CPU processor via built-in circuits, and the other end is connected to one end of the digital amplifier; the other end of the digital amplifier is connected to the bone conduction vibrator unit, and/or loudspeaker.

Further, the first earpiece and the second earpiece further comprise a first audio receiver and a second audio receiver; and both first audio receiver and the second audio receiver comprise two microphones, with one microphone positioned outside the first earpiece housing to capture ambient noise, and the other microphone facing inwards to collect user's speech input; the first audio receiver and the second audio receiver are electrically connected to the CPU processor.

4. BRIEF DESCRIPTION OF ACCOMPANY DRAWINGS

Figure 6:
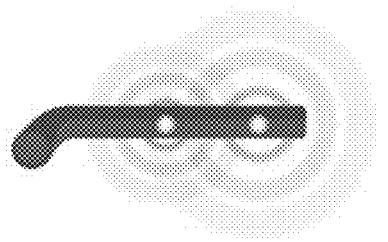
Figure 7:
Figure 8:
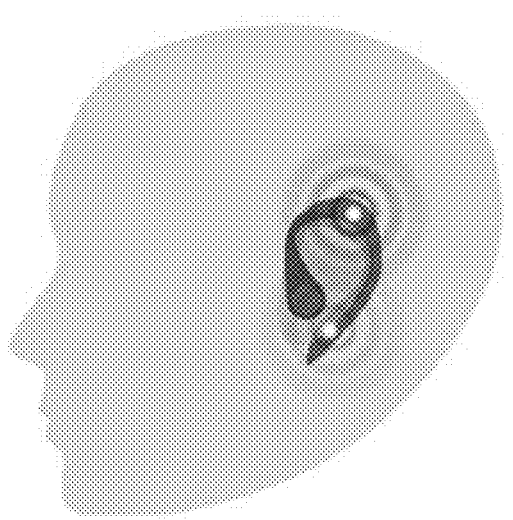
Figure 9:
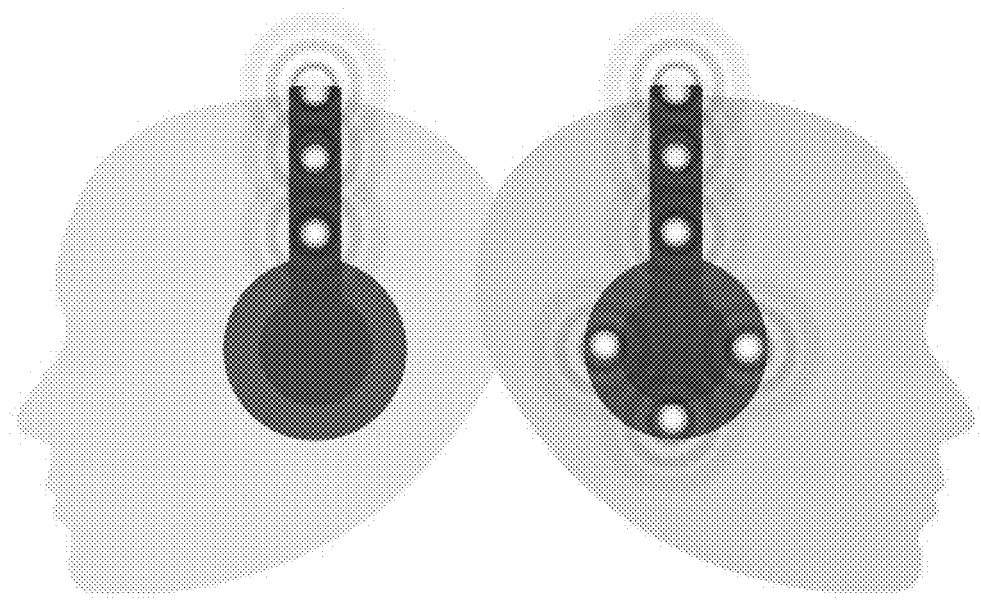
Figure 10:
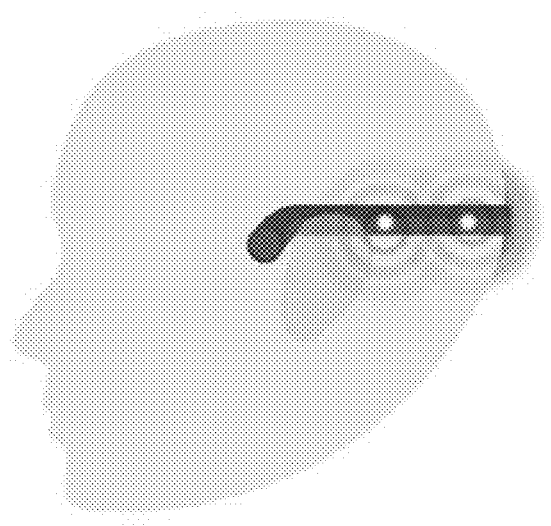
Figure 11:
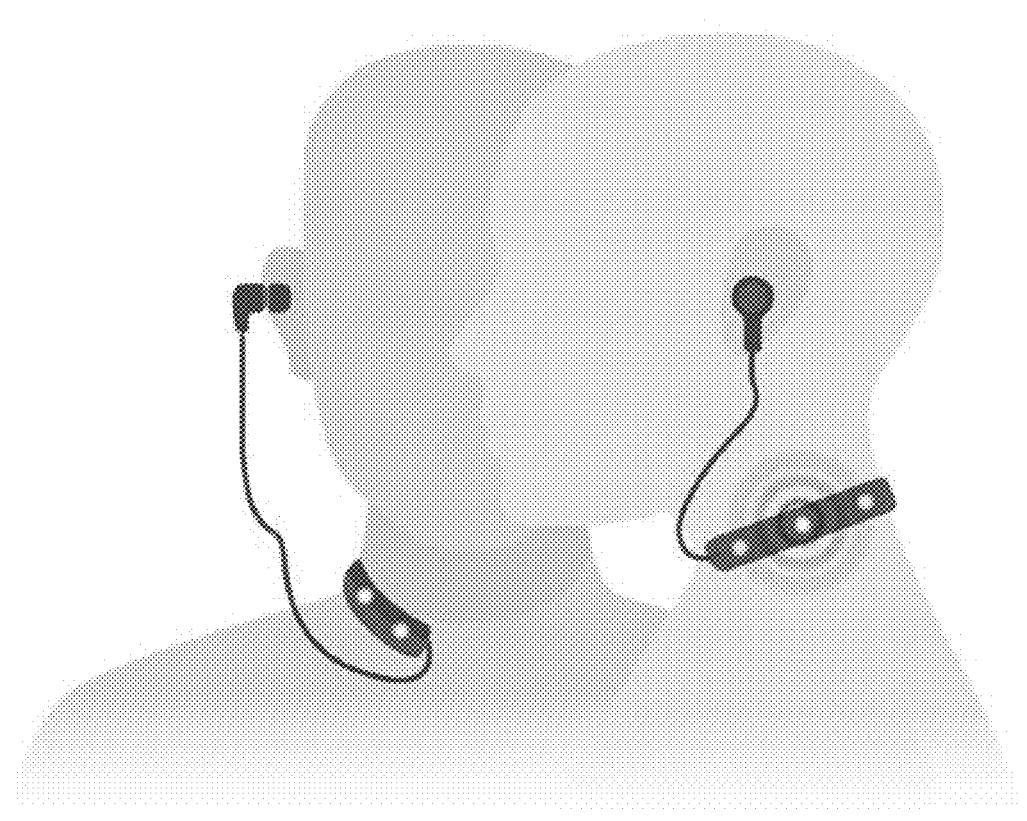

FIG. 6 is a surrounded bone conduction embodiment of a wearable device with a tangible user interface to provide haptic/kinesthetic feedback and multi-sensorial stimulation for the physicalization of remote digital interaction;

FIG. 7 is a neckband embodiment of a wearable device with a tangible user interface to provide haptic/kinesthetic feedback and multi-sensorial stimulation for the physicalization of remote digital interaction;

FIG. 8 is a wearing diagram of a wireless ear-hook embodiment of a wearable device with a tangible user interface to provide haptic/kinesthetic feedback and multi-sensorial stimulation for the physicalization of remote digital interaction;

FIG. 9 is a wearing diagram of a head-mounted embodiment of a wearable device with a tangible user interface to provide haptic/kinesthetic feedback and multi-sensorial stimulation for the physicalization of remote digital interaction;

FIG. 10 is a wearing diagram of a surrounded bone conduction embodiment of a wearable device with a tangible user interface to provide haptic/kinesthetic feedback and multi-sensorial stimulation for the physicalization of remote digital interaction;

FIG. 11 is a wearing diagram of a neckband embodiment of a wearable device with a tangible user interface to provide haptic/kinesthetic feedback and multi-sensorial stimulation for the physicalization of remote digital interaction;

In the figures, 1. the headband; 2. the first earpiece; 3. the second earpiece; 4. the audio modules; 5. the array of haptic/kinesthetic feedback actuators; 6. the CPU processor; 7. the power supply module; 8. the first audio receiver; 9. the second audio receiver; 10. the touch control module; 11. the headband housing.

5. SPECIFIC EMBODIMENT OF THE INVENTION

To make the invention more comprehensible, exemplary embodiments according to the application are described below in detail with reference to the accompanying drawings.

Figure 1:
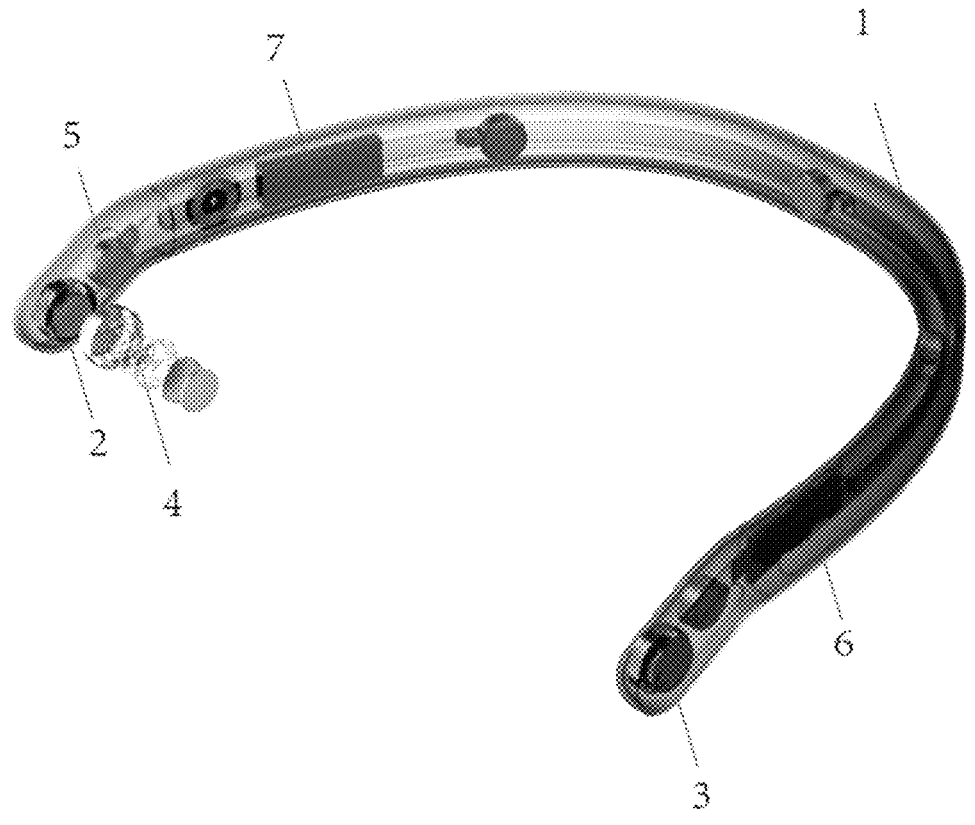
FIG. 1 is a schematic diagram showing the external structure of a wearable device with a tangible user interface to provide haptic/kinesthetic feedback and multi-sensorial stimulation for the physicalization of remote digital interaction.
Figure 2:
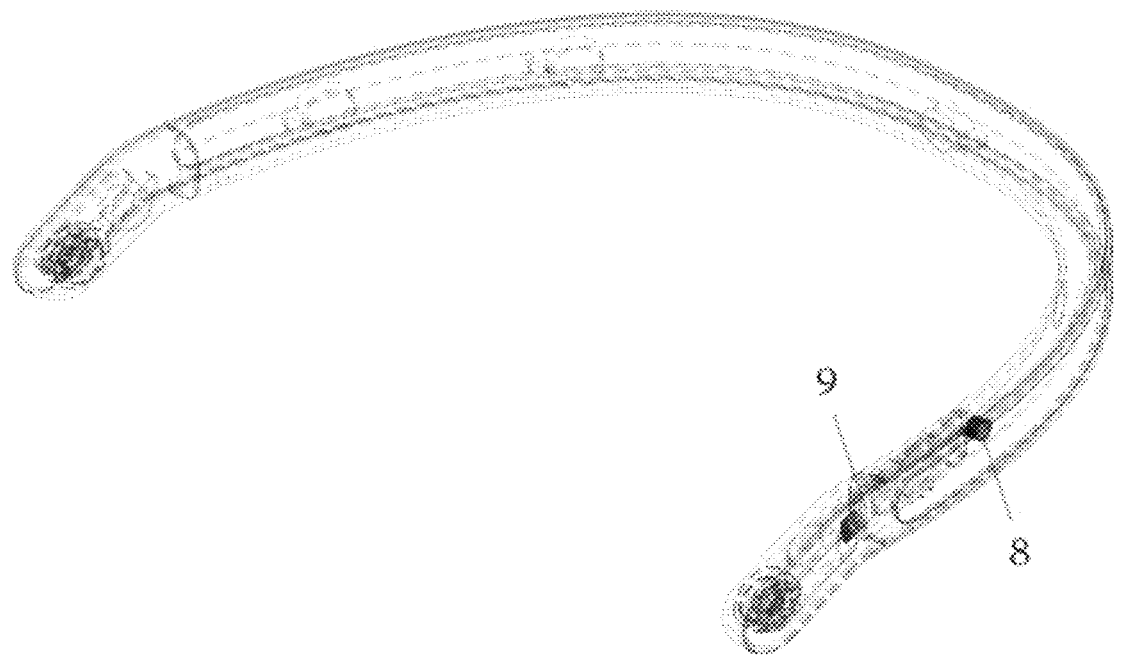
FIG. 2 is a schematic diagram showing the internal structure of a wearable device with a tangible user interface to provide haptic/kinesthetic feedback and multi-sensorial stimulation for the physicalization of remote digital interaction.
Figure 3:
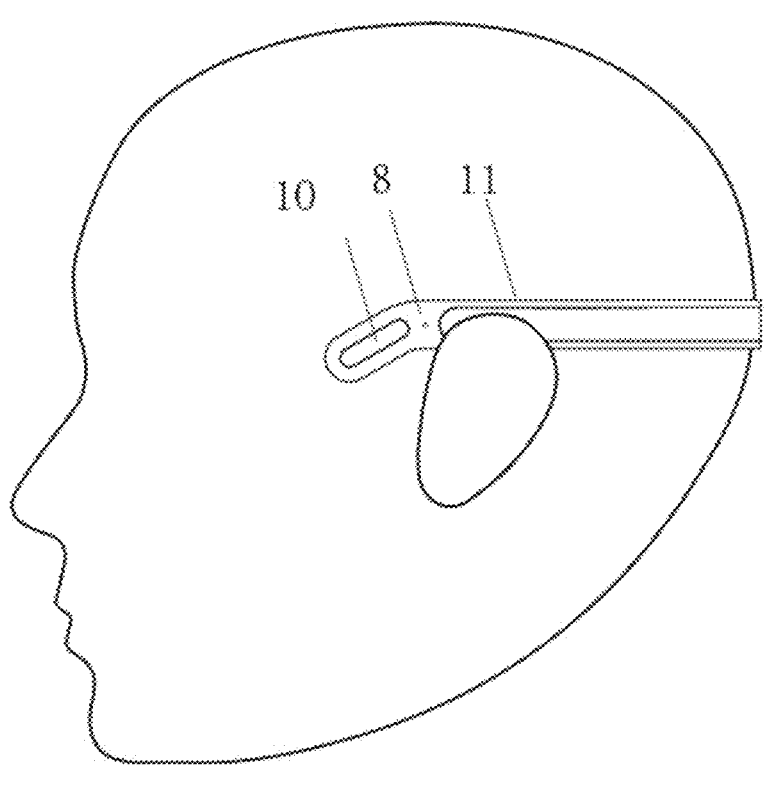
FIG. 3 is a schematic diagram showing the structure of a wearable device with a tangible user interface to provide haptic/kinesthetic feedback for the physicalization of remote digital interaction in use.
Figure 4:
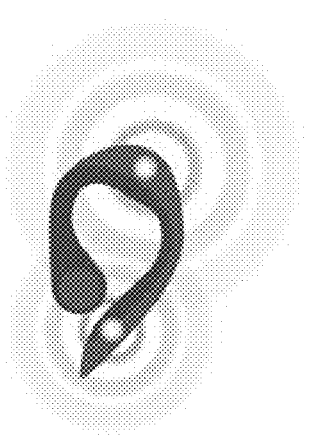
FIG. 4 is a wireless ear-hook embodiment of a wearable device with a tangible user interface to provide haptic/kinesthetic feedback and multi-sensorial stimulation for the physicalization of remote digital interaction.
Figure 5:
FIG. 5 is a head-mounted embodiment of a wearable device with a tangible user interface to provide haptic/ kinesthetic feedback and multi-sensorial stimulation for the physicalization of remote digital interaction.

In the specific embodiments of the invention, as shown in the embodiment of FIGS. 1 to 3, the embodiments provide a wearable device with a tangible user interface to provide haptic feedback and multi-sensorial stimulation for the physicalization of remote digital interaction, comprising a headband, an array of haptic/kinesthetic feedback actuators, the first ear piece and the second ear piece, physiological sensing modules (for example, but not limited to, optical heart rate sensor, and/or electroencephalogram recorder), and dynamic position sensing modules (for example, but not limited to, inertial measurement unit, accelerometer, and/or gyroscope). The array of the haptic/kinesthetic feedback actuators is embedded, and evenly or unevenly distributed as a surround ring across the headband. The outer part of the headband is fitted with a headband housing. The two ends of the headband housing are respectively connected to the first earpiece and the second earpiece, both of which have an embedded audio module (including, but not limited to, bone conduction audio module, or/and loudspeaker module). The power supply module is located on the headband positioned near the first-ear-piece end, and the CPU processor is located on the headband positioned close to the second-ear-piece end. The first audio receiver and the second audio receiver are also situated on the same side as the CPU processor;

A touch control module (for example, but not limited to, a touch-responsive surface that consists of electric-inducted materials) is also encased at the corresponding position on the headband.

Similarly, the invention can also be implemented as a wireless audio device ear-hook, head-mounted, or neckband audio device;

The wireless ear-hook embodiment comprises the first ear-hook body and the second ear-hook body, the first in-ear module and the second in-ear module, an array of haptic/kinesthetic feedback actuators. The first in-ear module and the second in-ear module are both encased by external housings. The first in-ear module and the second in-ear module comprise respectively a set of audio module, audio receiver, CPU processor, wireless communication module, battery module, physiological sensing modules (for example, but not limited to, optical heart rate sensor, and/or electroencephalogram recorder), and dynamic position sensing modules (for example, but not limited to, inertial measurement unit, accelerometer, and/or gyroscope). Two sets of haptic/kinesthetic feedback actuators in an array arrangement are embedded respectively in the first and second ear-hook body; a touch control module (for example, but not limited to, a touch-responsive surface that consists of electric-inducted materials) is also encased at the corresponding position on the first ear-hook body.

The head-mounted embodiment comprises a headband, an array of haptic/kinesthetic feedback actuators, the first earpiece and the second earpiece, physiological sensing modules (for example, but not limited to, optical heart rate sensor, and/or electroencephalogram recorder), and dynamic position sensing modules (for example, but not limited to, inertial measurement unit, accelerometer, and/or gyroscope). The array of the haptic/kinesthetic feedback actuators is embedded, and evenly or unevenly distributed, in the headband. The outer part of the headband is fitted with a headband housing. The two ends of the headband housing are respectively connected to the first earpiece and the second earpiece, both of which have an embedded audio module (including, but not limited to, bone conduction audio module, or/and loudspeaker module), audio signal processing and conversion module, driver, and internal circuits. The first earpiece comprises a CPU, a storage unit, a wireless communication module, the physiological sensing module, the dynamic position sensing module, the first audio receiver, and the second audio receiver. A touch control module (for example, but not limited to, a touch-responsive surface that consists of electric-inducted materials) is also encased at the corresponding position on the first earpiece. A power supply unit, comprising a power supply pack and a control chip, is encased in the second earpiece; all the modules are electrically connected to the CPU via I2C interface and wiring.

The neckband embodiment comprises a neckband, an array of haptic/kinesthetic feedback actuators, the first in-ear module and the second in-ear module, physiological sensing modules (for example, but not limited to, optical heart rate sensor, and/or electroencephalogram recorder), and dynamic position sensing modules (for example, but not limited to, inertial measurement unit, accelerometer, and/or gyroscope). The array of the haptic/kinesthetic feedback actuators is embedded, and evenly or unevenly distributed, in the neckband. The two ends of the neckband housing are connected to the first in-ear module and the second in-ear module via wiring and IC interfaces. The outer part of the neckband, the first in-ear module, and the second in-ear module are all fitted with respective housings. Each of the in-ear module has an embedded audio module (including, but not limited to, bone conduction audio module, or/and loudspeaker module), audio signal processing and conversion module, driver, and internal circuits. A CPU, a storage unit, and a wireless communication module are encased on the neckband near the first in-ear module end; and a power supply unit, comprising a power supply pack and a control chip, is encased in the second in-ear. The physiological sensing module, the first audio receiver, and the second audio receiver are situated in the first in-ear module; and the dynamic position sensing module is located at the second in-ear module, and/or encased in the neckband housing. A touch control module (for example, but not limited to, a touch-responsive surface that consists of electric-inducted materials) is also embedded at the corresponding position on the first in-ear module, and/or the neckband. All the modules are electrically connected to the CPU via I2C interface and wiring.

Further, as shown in the embodiment of FIGS. 1 to 3, the CPU processor comprises one or more processors, control units, storage, wireless communication circuits, physiological sensing modules (for example, but not limited to, optical heart rate sensor, and/or electroencephalogram recorder), dynamic position sensing modules (for example, but not limited to, inertial measurement unit, accelerometer, and/or gyroscope), power supply modules, storage unit, and wireless communication circuit; The physiological sensing module and the dynamic position sensing module are electrically connected to the CPU processor and power supply module through built-in circuits and I2C interface.

Further, as shown in the embodiment of FIGS. 1 to 3, The array of the haptic/kinesthetic feedback actuators is embedded in, and evenly or unevenly distributed, around the headband (encased within the ear-hook body in the case of wireless ear-hook device embodiment, and encased within the neckband in the case of the neckband embodiment), and is electrically connected to the CPU processor and power supply module through built-in circuits and I2C interface, providing surround vibration-based haptic and kinesthetic feedback.

Further, as shown in the embodiment of FIGS. 1 to 3, the first and the second earpiece comprise respectively a first ear clip housing and a second ear clip housing, and the first and the second ear clip housing interior are encased with respective audio modules (including, but not limited to, bone conduction audio module, or/and loudspeaker module), audio signal processing and conversion modules, drivers; a touch control module (for example, but not limited to, a touch-responsive surface that consists of electric-inducted materials) is also encased at the corresponding position at the exterior of the first ear clip housing; All modules are connected to the CPU processor and power supply module through built-in circuits and I2C interface inside the headband.

Further, as shown in the embodiment of FIGS. 1 to 3, the compatible audio module for the first earpiece comprises a bone conduction vibrator unit, and/or loudspeaker, and an audio signal processing unit; All modules are connected by built-in circuits, and the audio signal processor is electrically connected to the CPU processor and the power supply device via an I2C interface.

Further, as shown in the embodiment of FIGS. 1 to 3, the second earpiece comprises a second earpiece housing, an audio module, a biometric sensor, and a contact sensor; An LED module is embedded on the surface of the first earpiece housing; All modules are connected to the CPU processor and the power supply module through built-in circuits and an I2C interface within the headband.

Further, as shown in the embodiment of FIGS. 1 to 3, the audio module compatible with the second earpiece comprises a bone conduction vibrator unit, and/or a speaker, as well as an audio signal processing unit; All the audio signal processor is electrically connected to the CPU processor and the power supply device via built-in circuits and an I2C interface; specifically, the audio signal processing unit comprises a digital-to-analog conversion transducer module and a digital amplifier; one end of the digital-to-analog transducer module is electrically connected to the CPU processor via built-in circuits, and the other end is connected to one end of the digital amplifier; the other end of the digital amplifier is connected to the bone conduction vibrator unit, and/or loudspeaker.

Further, as shown in the embodiment of FIGS. 1 to 3, the first earpiece and the second earpiece further comprise a first audio receiver and a second audio receiver; and both first audio receiver and the second audio receiver comprise two microphones, with one microphone positioned outside the first earpiece housing to capture ambient noise, and the other microphone facing inwards to collect user's speech input; the first audio receiver and the second audio receiver are electrically connected to the CPU processor.

The invention has the following working principle: audio module, audio processing module, wireless communication module, touch control module, physiological information sensing module (such as but not limited to, optical heart rate sensor, and/or electroencephalogram recorder), dynamic position sensing module (such as but not limited to, accelerometer, and/or gyroscope), CPU (one or more processors), power supply module, array haptic and motion feedback generator (such as but not limited to vibration motor); the control unit also includes: voice recognition system, human-machine interaction module.

The technical solution also involves a unique 'haptic and kinesthetic feedback semantic database' and 'Tangible User Interface' to translate and map touch, gesture, voice and audio inputs to corresponding perceptible haptic representations, and achieve real-time input/interaction between humans and the devices. The integrated wearable device for the physicalization of remote digital interaction in the embodiments of the invention covers all functions, including but not limited to voice communication, audio playback, haptic and kinesthetic stimulation (including but not limited to vibrational stimulation), and playback control. The unique 'tactile and kinesthetic feedback semantic database' and 'Tangible User Interface' is a user interaction interface providing haptic, tactile and kinesthetic stimulation through mapping haptic, tactile and kinesthetic feedback signals to corresponding representations, following the principle guided by the 'tactile and kinesthetic feedback semantic database'. Wherein, the 'Tangible User Interface (TUI)' provides haptic, tactile and kinesthetic stimulation (including but not limited to, vibration stimulation from vibration motor as a single unit or in an array arrangement) through a series of haptic, tactile and kinesthetic feedback signals mapped and guided by the 'tactile and kinesthetic feedback semantic database' to activate the actuator module (including but not limited to, vibration stimulation from vibration motor as a single unit or in an array arrangement). As the wearable device is in direct contact with user's skin, the transmitted haptic, tactile and kinesthetic stimulation can be directly perceived by the user; wherein the vibration feedback and stimulation can stimulate either singular or multiple vibrational stimulation from either singular actuator module, or a series of actuator modules in array arrangement, and the vibration time, vibration interval, vibration sequence, and other parameters can be adjusted to correspond to different mapping targets.

The invention generally involves technology for the physicalization of remote digital interaction, introducing haptic and kinesthetic feedback in the traditional human-machine interaction and more specifically, involves a device with a dual-layers interface, comprising of a haptic-based tangible layer and an audio channel, through which introduces tactile and kinesthetic feedback into remote communication and translates gestures, facial expressions, tone of voice, and other tangible stimuli into haptic representations to augment the communication of emotions, feelings, semantics, and contextual meanings of the conversations. This dual-layers system forms a real-time two-way feedback loop that communicates audio as well as tactile and kinesthetic stimulations, which helps and augments people to comprehend the semantics, meanings, and contexts of the audio content or the conversation. The interface also incorporates a touch responsive panel that enables users to directly send and received gestures, activities, or other tangible stimuli. The invention has wide applications, including long-distanced voice communication, remote collaboration, audio augmentation, VR and AR augmentation, and other digital, remote, or immersive applications or scenarios.

The basic principles, main characteristics and advantages of the invention are described hereinabove. It should be understood by those skilled in the art that the description of above embodiments is not restrictive, and what is shown in the embodiments and specification is only one of the embodiments and principles of the invention, and the actual structure is not limited thereto. In summary, various modifications and improvements based on the technical solution without departing from the inventive purpose of the invention made by inspired ordinary technicians in the art without creative efforts shall all fall within the protection scope of the invention. It is intended that the scope of the invention be defined by the claims appended hereto and their equivalents.

What is claimed is:

1. A wearable device with a tangible user interface to provide haptic feedback and multi-sensorial stimulation for the physicalization of remote digital interaction, which comprises a headband (1), a first earpiece (2), a second earpiece (3), an array of haptic/kinesthetic feedback actuators (5), a physiological sensing module, and a dynamic position sensing module;

wherein an adaptable headband housing (11) is externally attached to the headband (1), and the array of haptic/kinesthetic feedback actuators (5) are evenly or unevenly distributed across the headband (1);

the headband housing (11) is connected with the first earpiece (2) at a first end and the second earpiece (3) at a second end, and both the first earpiece (2) and the second earpiece (3) are equipped with audio modules (4);

the first earpiece (2) is provided with a power supply module (7), the second earpiece (3) is provided with a central processing unit (CPU) processor (6), a first audio receiver (8), and a second audio receiver (9); and a touch control module (10) is also provided at the headband housing (11);

wherein the first earpiece (2) comprises a first ear clip housing, and the first ear clip housing interior is provided with audio module (4) for the first earpiece (2), and the touch control module (10) corresponding to the exterior of the first ear clip housing; the audio module (4) and the touch control module (10) are connected to the CPU processor (6) and power supply module (7) through built-in circuits and I2C interface inside the headband (1).

2. A wearable device with a tangible user interface to provide haptic feedback and multi-sensorial stimulation for the physicalization of remote digital interaction as claimed in claim 1, wherein the CPU processor (6) comprises one or more processors, control units, storage units, wireless communication circuits, physiological information sensing modules, dynamic position sensing modules, and power supply modules (7), and the one or more the storage units, wireless communication circuits, physiological information sensing modules and dynamic position sensing modules are electrically connected to the CPU processor (6) and power supply module (7) through built-in circuits.

3. A wearable device with a tangible user interface to provide haptic feedback and multi-sensorial stimulation for the physicalization of remote digital interaction as claimed in claim 2, wherein the audio module (4) for first earpiece comprises a bone conduction vibrator unit and/or loudspeaker and an audio signal processor connected by built-in circuits, and the audio signal processor is electrically connected to the CPU processor (6) and the power supply device (7) via an I2C interface.

4. A wearable device with a tangible user interface to provide haptic feedback and multi-sensorial stimulation for the physicalization of remote digital interaction as claimed in claim 1, wherein the array of the haptic/kinesthetic feedback actuators (5) is evenly or unevenly distributed circumferentially along the headband (1) and is electrically connected to the CPU processor (6) and power supply module (7) through built-in circuits of the headband (1), providing surrounded vibration-based haptic and kinesthetic feedback and multi-sensorial stimulations.

5. A wearable device with a tangible user interface to provide haptic feedback and multi-sensorial stimulation for the physicalization of remote digital interaction as claimed in claim 1, wherein the second earpiece (3) comprises a second ear clip housing, and the audio module (4) for the second earpiece, a heart rate sensor, a electroencephalogram recorder, a contact sensor; and an light emitting diode (LED) module are provided compatible within the second earpiece (3); and the audio module, the heart rate sensor, the electroencephalogram recorder, and the contact sensor are connected to the CPU processor (6) and the power supply module (7) through built-in circuits and an I2C interface within the headband (1).

6. A wearable device with a tangible user interface to provide haptic feedback and multi-sensorial stimulation for the physicalization of remote digital interaction as claimed in claim 1, wherein the audio module (4) of the second earpiece (3) comprises a cartilage conduction vibrator unit or a speaker, as well as an audio signal processor connected through built-in circuits; the audio signal processor is electrically connected to the CPU processor (6) and the power supply device (7) via an I2C interface; the audio signal processor comprises a digital-to-analog conversion chip and a digital amplification chip; one end of the digital-to-analog conversion chip is electrically connected to the CPU processor (6) via wires, and the other end is connected to one end of the digital amplification chip; the other end of the digital amplification chip is connected to the cartilage conduction vibrator unit or speaker (4).

7. A wearable device with a tangible user interface to provide haptic feedback and multi-sensorial stimulation for the physicalization of remote digital interaction as claimed in claim 1, wherein the first earpiece (2) and the second earpiece (3) further comprise a first audio receiver (8) and a second audio receiver (9); and both first audio receiver (8) and the second audio receiver (9) comprise two microphones, with one microphone positioned for capturing ambient noise, and the other microphone for collecting user speech; and the first audio receiver (8) is electrically connected to the CPU processor (6).

8. A wearable device with a tangible user interface to provide haptic feedback and multi-sensorial stimulation for the physicalization of remote digital interaction as claimed in claim 1, wherein the physiological sensing module comprises one of the optical heart rate sensors or the electroencephalogram recorder.

9. A wearable device with a tangible user interface to provide haptic feedback and multi-sensorial stimulation for the physicalization of remote digital interaction as claimed in claim 1, wherein the dynamic position sensing module comprises one of an accelerometers or a gyroscope.

10. A wearable device with a tangible user interface to provide haptic feedback and multi-sensorial stimulation for the physicalization of remote digital interaction as claimed in claim 1, wherein the Tangible User Interface (TUI) is further configured to map audio and/or gesture inputs to haptic, tactile, and kinesthetic output patterns according to a tactile and kinesthetic feedback semantic database executed by the CPU processor (6).

\* \* \* \* \*